United States Patent [19]

Colella

[11] Patent Number: 4,819,265
[45] Date of Patent: Apr. 4, 1989

[54] DISPOSABLE COVER FOR TELEPHONE

[76] Inventor: James A. Colella, 94 Claremont Ave., Buffalo, N.Y. 14223

[21] Appl. No.: 216,192

[22] Filed: Jul. 7, 1988

[51] Int. Cl.$^4$ .............................................. H04M 1/17
[52] U.S. Cl. ................................................... 379/452
[58] Field of Search ................. 379/452, 437, 439, 451

[56] References Cited

U.S. PATENT DOCUMENTS

| | | | |
|---|---|---|---|
| D. 214,322 | 6/1969 | Velasquez | 379/451 |
| D. 217,059 | 3/1970 | Todeschini | 379/451 |
| D. 224,023 | 6/1972 | Cliburn | 379/451 |
| D. 226,612 | 4/1973 | Robinson | 379/451 |
| 2,078,877 | 4/1937 | Hoyland | 379/451 |
| 2,507,375 | 5/1950 | Hartwell et al. | 379/421 |
| 2,575,280 | 11/1951 | Long | 379/451 |
| 3,304,379 | 2/1967 | Memmel et al. | 379/452 |
| 3,962,555 | 6/1976 | Efaw | 379/451 |
| 4,546,217 | 10/1985 | Frehn | 379/452 |
| 4,570,038 | 2/1986 | Tinelli | 379/451 |
| 4,736,418 | 4/1988 | Steadman | 379/451 |

Primary Examiner—Jin F. Ng
Assistant Examiner—Danita R. Byrd
Attorney, Agent, or Firm—James J. Ralabate

[57] ABSTRACT

A telephone handset cover that is disposable and impregnated throughout with a germicidal composition. The handset cover has a top center slit in its back portion which permits a handset to be inserted therein. After the handset is contained within the cover, a tab that extends across the top center slit will close the slit. On the inside of the cover next to the inside adhesive surface of the tab is a second adhesive surface. This second adhesive surface connects and fixes the cover to the handset.

12 Claims, 1 Drawing Sheet

DISPOSABLE COVER FOR TELEPHONE

This invention relates to telephone covers and, more particularly, to a sterile disposable telephone cover.

BACKGROUND OF THE INVENTION

It is known to use various covers for telephones for decorative, sanitary and hygenic reasons.

In locations where telephone handsets are used by several people such as in telephone booths or phones in airports, train stations, schools, hospitals and other public facilities, it is desirable to provide some degree of protection to the public using these phones. There is no doubt that various diseases may be communicated because of germs in the phone mouthpiece, handle or earpiece. The telephone handsets rarely are cleaned and, since frequent cleansing is improbable, it has been suggested that various covers be used to provide a degree of protection. Most covers used for this purpose do not cover the entire handset but rather cover either the mouthpiece or part of the handle and mouthpiece. It is common that germs can be just as easily communicated to others from the handle as well as the mouthpiece or earpiece. This is especially true in hospitals where patients with a variety of communicable diseases use the same phones. It is desirable to have a disposable, simple, inexpensive phone cover that will provide adequate protection and yet not interfere with clear voice transmission and reception.

There have been various attempts to provide covers that can be used on telephones that would minimize the spread of germs therefrom. Some of these covers are the type disclosed in U.S. Pat. Nos. Des. 214,322; 2,078,877; 2,507,375; 3,304,379; 3,962,555; 4,570,038 and 4,736,418. In U.S. Pat. No. Des. 214,322 a disposable handset cover is illustrated which covers only a portion of the phone handle. Medical authorities are agreed that germs can be spread from hand contamination as well as through the ear, nose and mouth. The type of handset cover in U.S. Pat. No. Des. 214,322 does not cover the entire handle and thus does not provide adequate protection to the user. In U.S. Pat. No. 2,078,877 (Hoyland) an antiseptic device is disclosed which fits over the mouthpiece of the phone. Again, in devices of this type, there is no protection from germs transmitted from the handle or earpiece. In U.S. Pat. No. 2,507,375 (Hartwell) another protective device is disclosed which only covers the mouthpiece of a telephone. There is no cover protection from germs located in the handle or earpiece. In U.S. Pat. No. 3,304,379 (Memmel) a protective, hygenic cover is disclosed for use over mouthpieces or earpieces of telephones. There is no protection provided by Memmel for germs that can be transmitted from the handpiece or handle of the phone. In U.S. Pat. No. 3,962,555 (Efaw) a telephone guard is disclosed which covers the mouthpiece and the earpiece (receiver) and only a portion of the handle. This type guard does not reduce the spread of germs found on the uncovered portion of the handle. In U.S. Pat. No. 4,570,038 (Tinelli) a sanitary cover is disclosed for use over the sound transmitting portion of a telephone handset, either or both the mouthpiece and the receiver. No provision is made in Tinelli for covering the handset or portions other than the "sound transmitting portions of telephones". Thus, the handle portion which also can spread germs is left unprotected in devices such as Tinelli's. U.S. Pat. No. 4,736,418 (Steadman) discloses a phone cover which covers the entire handset to make the handset more decorative and attractive. When Steadman covers the entire phone she uses annular rings on the earpiece and mouthpiece. In the second embodiment of Steadman the mouthpiece and earpiece are left open. Steadman's device is intended to be decorative. Steadman's cover is relatively complex and expensive since it requires annular rings that fit over both the mouthpiece and earpiece and apparently provides cushioning means. These cushioning means are suggested by Steadman to be made from foam or cotton. These cushions themselves can accumulate and transmit germs to the user. The cover of Steadman is reusable and washable and can be made from "cotton or silk or wool or synthetics such as nylon or polyester or even fur-like materials". This type cover would be relatively expensive and would not afford the ultimate hygenic protection to the user. In addition, Steadman discloses an overlapping closure means which requires Velcro closure strips to hold the cover in position. Alternatively, Steadman suggests using hooks, snaps or buttons to close the cover.

There is no prior art cover which provides maximum germicidal protection on all portions of the phone, is disposable, is inexpensive and of a simple construction and, importantly, that secures the cover in position during use yet is easily removed and replaced.

SUMMARY OF THE INVENTION

It is therefore an object of the present invention to provide a sterile telephone handset cover devoid of the above-noted disadvantages.

Another object is to provide a germicidal phone cover that covers the entire telephone handset structure and is held in place by a simple securing means.

A further object of this invention is to provide a simple, inexpensive and disposable sterile telephone handset cover.

A still further object of this invention is to provide a handset cover that minimizes the communication of germs from phones that are shared by several people.

A still further object of this invention is to provide a sterile handset cover that can be selectively impregnated with a variety of germicidal agents.

Another still further object of this invention is to provide a sterile handset cover that is easily attached to a phone and simple and inexpensive to replace.

These and other objects are accomplished by this invention generally speaking by providing a sterile handset cover that is disposable. This cover is preferably constructed of paper which encloses the entire phone structure and has perforations in the earpiece and mouthpiece so as not to interfere with voice reception or voice transmittal. The cover has a top center slit in the back which permits the handset to be inserted therein and is secured in place by a top glued flip tab that has adhesive which extends to at least a part of the handle of the handset and is fixed thereto. The remainder of the top glued flip tab extends to and is connected to the opposite slit side of the cover. Thus, it is important to this invention that the same glued closure means that closes the slit once the handset is inserted therein, also secures the cover to the phone handle and prevents it from moving while in use. Other prior art covers do not suggest means to prevent shifting of the cover while in use. Other covers also do not cover the entire handset structures. The germicide is contained in the entire handle and provides equal protection in the use of the mouthpiece, earpiece and handle. A cutout portion is provided to accommodate the phone cord. Various known germicides, bactercides, fungicides or other disinfectants may be used to impregnate the entire cover of this invention. The term "germicide" used throughout this disclosure and the claims is intended to include all types of germicides, fungicides, bactericides, and other agents to control undesirable microorganisms. Antimicrobial materials disclosed in U.S. Pat. No. 4,570,038 can easily be impregnated in the cover of the present invention. These materials can be selectively used on the cover. For example, if a hospital ward has several patients with bacterial infections, an appropriate bactericide may be used, etc. The cover is preferably made from conventional porous papers that are presently available and are relatively inexpensive.

DETAILED DESCRIPTION OF THE DRAWING AND PREFERRED EMBODIMENT

Figure 1:
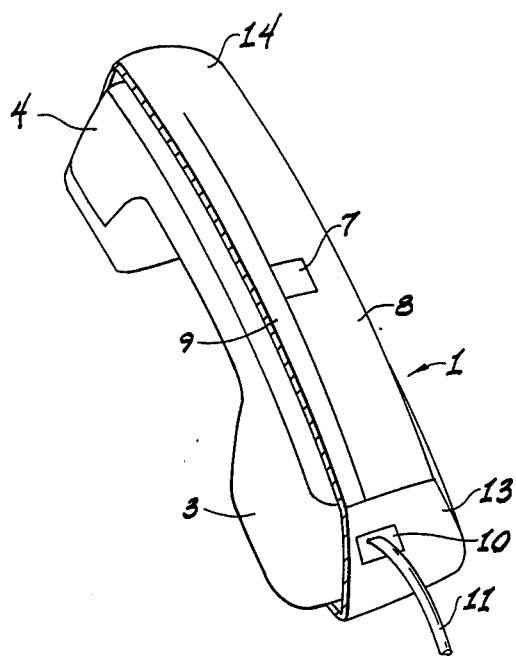
FIG. 1 is a perspective view of the phone cover of this invention when enclosing a conventional phone.

In FIG. 1 the cover 1 is illustrated as it encloses a handset 2. The cover 1 encloses the entire handset structure and is impregnated throughout with a germicide or disinfectant. This is to provide maximum protection to the handset user from germs left by a previous user on the mouthpiece 3, earpiece 4 or handle of the handset. The cover 1 has a top center slit 6 in the back for easy access to a phone structure to be inserted therein. Approximately halfway up the length of slit 6 is a locking means or glued tab 7 which performs a dual function. First, it attaches side 8 to side 9 on either side of slit 6 and, secondly, its underside has an adhesive which attaches onto handset handle and prevents the cover 1 from shifting, sliding or moving when in use. This feature is important to this invention and permits an effective, inexpensive securing means which is necessary with a disposable cover. Tab 7, preferably, has a peel-off upper layer that exposes an adhesive when removed. The adhesive then connects side 8 to side 9 and fixes the cover to the handset handle. The closure means 7 ensures that no part of the handset handle which may be contaminated is exposed to the user. At the lower portion of cover 1 is a cutout section 10 that accommodates the phone cord 11 when in use.

Any suitable known adhesive may be used on closure means or tab 7. Typical peel-off type adhesive means available and presently known are preferred. This type closure means permits the handset to be put into the cover 1 without obstruction, then tab 7 secured to opposite side of cover and to phone handle.

Figure 2:
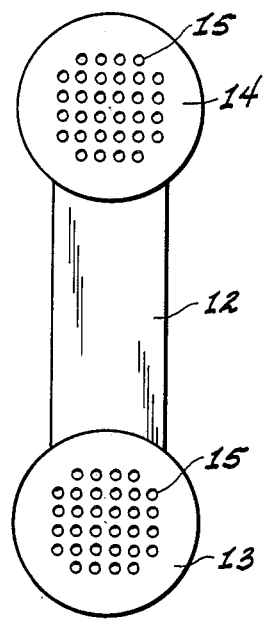
FIG. 2 is a plan view of the front of the cover of this invention.

In FIG. 2 the front view of cover 1 is shown having front cover-handle means 12, cover-mouthpiece 13 and cover-earpiece 14, all impregnated throughout with the appropriate germicide. Both mouthpiece 13 and earpiece 14 have perforations 15 to accommodate clear voice transmission and reception therefrom. These perforations may be aligned with the phone perforations if desired but, obviously, that is not necessary for proper use of cover 1.

Figure 3:
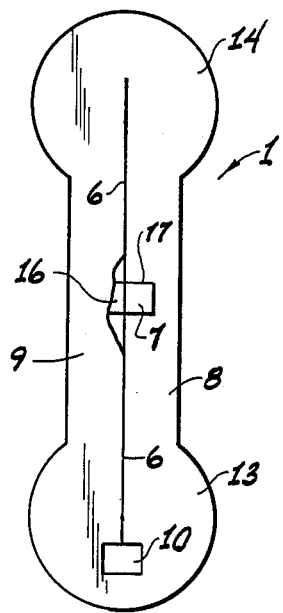
FIG. 3 is a plan view of the back of the cover of this invention.

In FIG. 3 the back side of cover 1 is shown having slit 6 running approximately midway lengthwise through the width of cover 1 back. On either side of slit 6 are sides 8 and 9. On side 9 is positioned and extending outwardly therefrom a closure tab 7 for attaching to side 8 and for attaching and fixing cover 1 in position by adhering to handset handle 5. This closure means keeps the entire handset covered and minimizes exposure of portions of the handset that may be contaminated. The tab 7 has an adhesive on its back or inner side and the adhesive extends to the underside portion 16 of side 9 adjacent the tab portion as is more clearly shown in FIG. 4. The exposed adhesive on the bottom portion of tab 7 at position 17 attaches onto side 8 while the exposed adhesive underside 9 at position 16 adjacent the underside of tab 7 attaches onto the handset handle 5 and prevents the cover 1 from slipping or moving during use. This feature is important to the invention since no other disposable handset cover has solved the cover-moving problem during usage. The underside 17 of closure or tab 7 and the underside 16 of side 9 both have an adhesive which is exposed by peeling away an overcoating strip and when pressed against cover side 8 and handset handle are fixed thereto.

Figure 4:
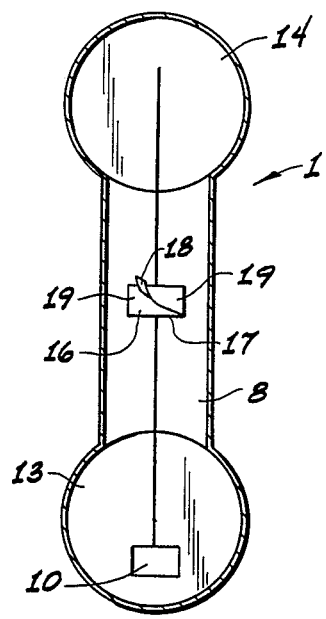
FIG. 4 is a perspective view of the novel securing means from inside of the cover of this invention.

In FIG. 4 the inside portion of cover 1 is shown to illustrate the adhesive portions 16 and 17, underside 9 and tab 7, respectively. A peel-off strip 18 is removed from surface 16 and 17 to expose the adhesive 19 thereon. When peel-off strip 18 is removed, adhesive portion 17 (of tab 7) is pressed against side 8 thereby connecting side 8 to side 9 as shown in FIG. 3. The exposed adhesive at position 16 (underside of side 9 adjacent underside of tab 7) is pressed against phone handle 5 and fixes the entire cover 1 in place, keeping any movement of cover 1 to a minimum when in use. While a strip-off or peel-off 18 strip system is preferred other inexpensive glue or adhesive systems appropriate for disposable covers such as the present one may be used. Velcro or other relatively expensive closure systems are not appropriate and do not lend themselves for use in paper or disposable covers such as the present cover. The closure system in the present invention is not only inexpensive and easy to use but is very effective in holding the cover in place.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A disposable telephone handset cover that comprises a cover in the form of a handset, said cover impregnated throughout with a germicidal material, said cover having means to cover the entire handset structure, said cover having a top center slit on its back portion for insertion of the handset therein, said top center slit forming thereby two separated sides on either side of said top center slit, one of said sides having a tab extending outwardly therefrom and overlapping an area over the other side, said tab having adhesive means comprising an adhesive on its inner or under surface, said adhesive extending beyond the underside of said tab to the underside of said cover portion adjacent said tab underside, said tab having adhesive means to connect said separated sides, said portion adjacent said tab having adhesive means to connect onto said phone.

2. The disposable cover of claim 1 wherein said adhesive means is a peel-off adhesive means.

3. The disposable cover of claim 1 wherein said cover has a mouthpiece and earpiece with perforations to accommodate sound transmission and sound reception.

4. The disposable cover of claim 1 wherein said cover has a cutout portion to accommodate a phone cord.

5. The disposable cover of claim 1 wherein said cover when fixed in place has means to enclose the entire handset structure.

6. The disposable cover of claim 1 wherein said cover has a cutout portion on a backside of a mouthpiece portion of said cover.

7. A disposable telephone handset cover comprising a cover body impregnated throughout with a composition selected from the group consisting of germicides, disinfectants, fungicides bactericides and mixtures thereof, said cover body having a handle portion, a mouthpiece portion and an earpiece portion, each capable of enclosing the entire respective parts of a handset, said handle portion having a top center slit in its back section from which the handset is inserted into said cover body, said top center slit having a first and second side on either side of said top center slit, said first side having a tab extending outwardly therefrom and overlapping over the second side, the tab having an underside surface with an adhesive, adjacent the underside of said tab is an adhesive cover section also containing said adhesive, said adhesive on said tab having means to connect onto said second side thereby connecting said first and second sides together, said adhesive cover section having means to fix said cover to a telephone handset handle.

8. The disposable cover of claim 7 wherein said adhesive means is a peel-off adhesive means.

9. The disposable cover of claim 7 wherein said cover has a mouthpiece and earpiece with perforations to accommodate sound transmission and sound reception.

10. The disposable cover of claim 7 wherein said cover has a cutout portion to accommodate a telephone cord.

11. The disposable cover of claim 7 wherein said cover when fixed in place has means to enclose the entire telephone handset structure.

12. The disposable cover of claim 7 wherein said cover has a cutout portion on a back side of a mouthpiece portion of said cover.

* * * * *